United States Patent
Smith et al.

(10) Patent No.: US 9,677,625 B2
(45) Date of Patent: Jun. 13, 2017

(54) CONCENTRIC SLAVE CYLINDER INCLUDING ONE-WAY CLUTCH

(71) Applicant: Schaeffler Technologies AG & Co. KG, Herzogenaurach (DE)

(72) Inventors: David Smith, Wadsworth, OH (US); James Copeland, Massillon, OH (US); Nicholas Hrusch, Thompson, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 33 days.

(21) Appl. No.: 14/621,055

(22) Filed: Feb. 12, 2015

(65) Prior Publication Data

US 2015/0233431 A1 Aug. 20, 2015

Related U.S. Application Data

(60) Provisional application No. 61/942,396, filed on Feb. 20, 2014.

(51) Int. Cl.
| | |
|---|---|
| *F16D 21/00* | (2006.01) |
| *F16D 25/12* | (2006.01) |
| *F16D 25/08* | (2006.01) |
| *F16J 1/00* | (2006.01) |

(52) U.S. Cl.
CPC ......... *F16D 25/126* (2013.01); *F16D 25/083* (2013.01); *F16J 1/008* (2013.01); *Y10T 29/49826* (2015.01)

(58) Field of Classification Search
CPC ........ F16D 25/126; F16D 25/083; F16J 1/008
See application file for complete search history.

(56) References Cited

U.S. PATENT DOCUMENTS

| | | | | | |
|---|---|---|---|---|---|
| 3,478,853 | A | * | 11/1969 | Kraeplin | F16D 13/755 192/111.14 |
| 5,620,076 | A | * | 4/1997 | Voit | F16D 25/083 192/111.14 |
| 5,743,370 | A | * | 4/1998 | Thomire | F16D 25/083 192/85.51 |
| 5,810,145 | A | * | 9/1998 | Thomire | F16D 25/083 192/115 |

(Continued)

FOREIGN PATENT DOCUMENTS

| | | |
|---|---|---|
| JP | 2012-215260 A | 11/2012 |
| WO | WO 2014-019583 A1 | 2/2014 |

OTHER PUBLICATIONS

International Search Report and Written Opinion Corresponding PCT/US2015/015702.

*Primary Examiner* — David J Hlavka
(74) *Attorney, Agent, or Firm* — Davidson, Davidson & Kappel, LLC

(57) ABSTRACT

A concentric slave cylinder is provided. The concentric slave cylinder includes a housing including a wall; a piston slidable along the wall in a forward direction and a return direction, the piston including a first angled surface, the piston and the housing forming a hydraulic chamber therebetween; and a ring slidable along the wall in the hydraulic chamber in the forward direction and limiting sliding of the piston in the return direction, the ring including a frustoconical portion having a second angled surface for engaging the first angled surface to limit the sliding of the piston in the return direction.

18 Claims, 4 Drawing Sheets

(56) References Cited

U.S. PATENT DOCUMENTS

| | | | |
|---|---|---|---|
| 6,328,148 B2* | 12/2001 | Winkelmann | 192/85.51 |
| 7,913,585 B2* | 3/2011 | Smith | F16D 13/75 |
| | | | 192/111.13 |
| 2001/0004038 A1 | 6/2001 | Winkelmann et al. | |
| 2001/0047918 A1 | 12/2001 | Koschmieder et al. | |
| 2003/0010595 A1* | 1/2003 | Heller | F16D 25/083 |
| | | | 192/85.51 |
| 2004/0163922 A1* | 8/2004 | Ester | F16D 25/083 |
| | | | 192/85.49 |
| 2011/0283830 A1 | 11/2011 | Renard et al. | |
| 2014/0182994 A1* | 7/2014 | Bosnjak | F16D 25/08 |
| | | | 192/85.57 |

* cited by examiner

CONCENTRIC SLAVE CYLINDER INCLUDING ONE-WAY CLUTCH

This claims the benefit to U.S. Provisional Patent Application No. 61/942,396, filed on Feb. 20, 2014, which is hereby incorporated by reference herein.

The present disclosure relates generally to concentric slave cylinders and more specifically to systems including concentric slave cylinders in clutch systems.

BACKGROUND

FIG. 1 shows a known direct actuated clutch system 10 for a motor vehicle including a concentric slave cylinder (CSC) 12 and a hydraulic actuator unit 14 experiences degraded performance with wear of one or more clutch discs 16 of a clutch. As clutch disc 16 wears, the travel of an actuator piston 18 and a CSC piston 20 become longer to compensate for increased clearances within the clutch. As these travels increase due to wear, the engagement and disengagement times also increase. To work with the worst case travel conditions, system 10 is designed to include large and expensive components.

In system 10, actuator piston 18 needs to retract to its zero position in order to reach a bleed refill passage 22 of a reservoir 24. Passage 22 is critical to maintain the correct fluid volume in the system due to leakage and thermal expansion of the hydraulic fluid. The actuator piston 18 is also stroked to push the CSC piston 20, which is in hydraulic communication with hydraulic actuator unit 14 via a high pressure line 26, outward toward the clutch discs 16. This distance CSC piston 20 is pushed is the engagement travel. As the clutch discs 16 wear, the engagement travel increases. As the discs 16 wear, the lift-off gap in the clutch increases.

SUMMARY OF THE INVENTION

A concentric slave cylinder is provided. The concentric slave cylinder includes a housing including a wall; a piston slidable along the wall in a forward direction and a return direction, the piston including a first angled surface, the piston and the housing forming a hydraulic chamber therebetween; and a ring slidable along the wall in the hydraulic chamber in the forward direction and limiting sliding of the piston in the return direction, the ring including a frustoconical portion having a second angled surface for engaging the first angled surface to limit the sliding of the piston in the return direction.

A method for forming a concentric slave cylinder is also provided. The method includes sliding a ring into a cut-away portion of a body portion of a piston; fixing a base portion of the piston to the body portion of the piston; and sliding the piston along a wall of housing forming a bore hole such that a first angled surface of the piston contacts a second angled surface of the ring. The ring and piston are installed in the bore hole such that the piston and the ring are slidable toward an opening of the hole and the ring limits sliding of the piston away from the opening of the hole.

BRIEF DESCRIPTION OF THE DRAWINGS

The present invention is described below by reference to the following drawings, in which.

DETAILED DESCRIPTION

The extra travel experienced by worn clutch disc, as compared to new clutch discs, is undesirable free travel, where the clutch opens more than is necessary for function. This extra free travel can be eliminated by forming a one-way clutch in the CSC. When the clutch is opened, the CSC piston refraction travel is limited by the one-way clutch, while allowing the actuator piston to advantageously still be able to retract to the bleed passage.

The present disclosure provides a one-way clutch in the CSC to limit the engagement travel to a specific distance. As the clutch wears and the CSC engagement travel increases, the one-way clutch adjusts and limits the disengagement travel. The one-way clutch is designed so that travel of pistons is as short for worn clutch discs as it is for new clutch discs. The direct actuated clutch system in which such a CSC is used may then be made smaller with more inexpensive components, improving system efficiency while reducing system costs.

CSCs in accordance with embodiments of the present invention are accordingly provided with at least one piston displacing a release bearing in a first direction. The CSC includes a ring for limiting motion of the piston in a second, opposite direction. The ring is displaceable in the first direction by a wall of the cylinder, but wedged in the opposite direction by a conical surface of the piston. An axial distance between the wall and the conical surface controls piston travel to improve system response after wear.

Figure 1:
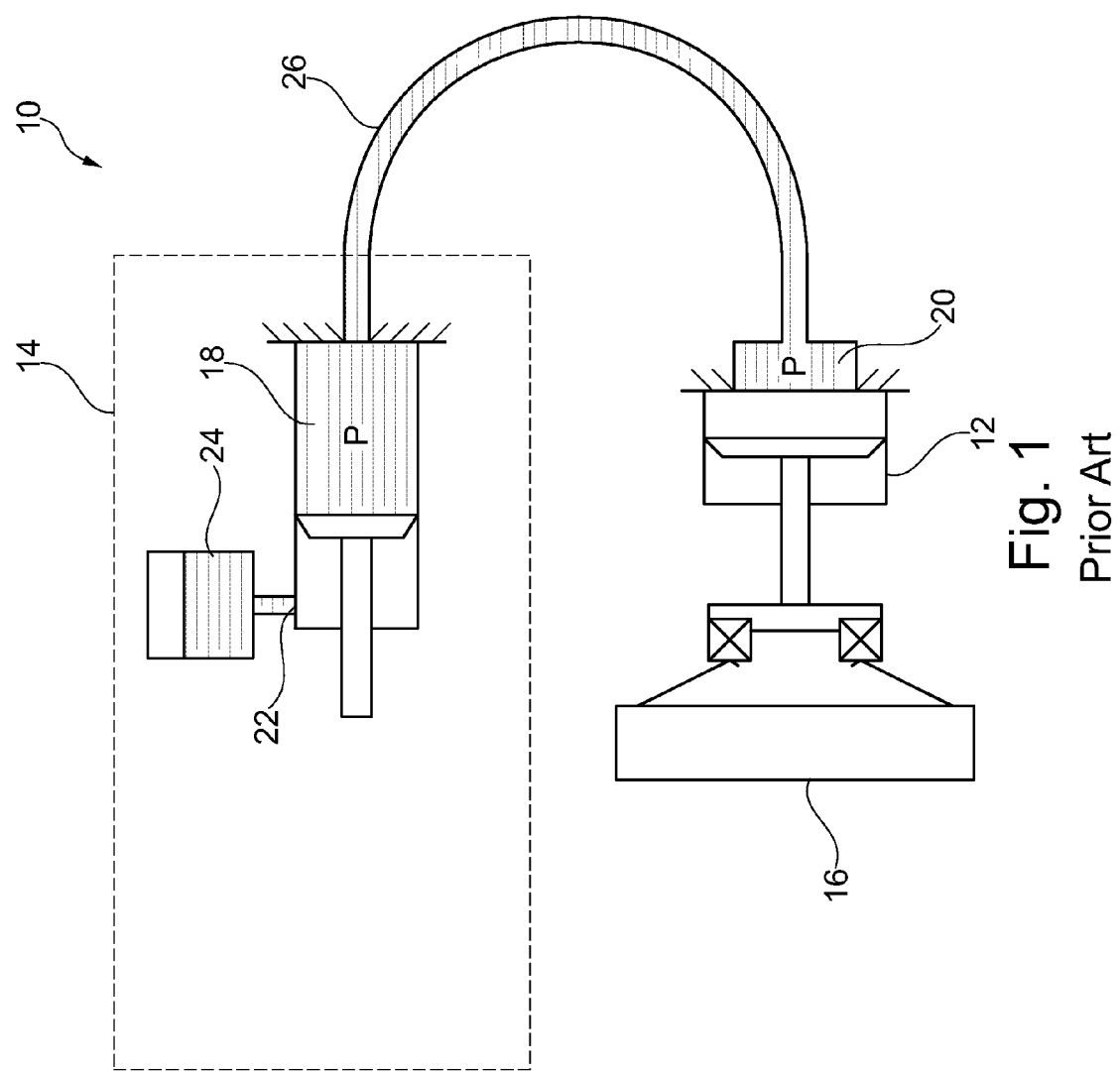
FIG. 1 shows a known direct actuated clutch system.
Figure 2:
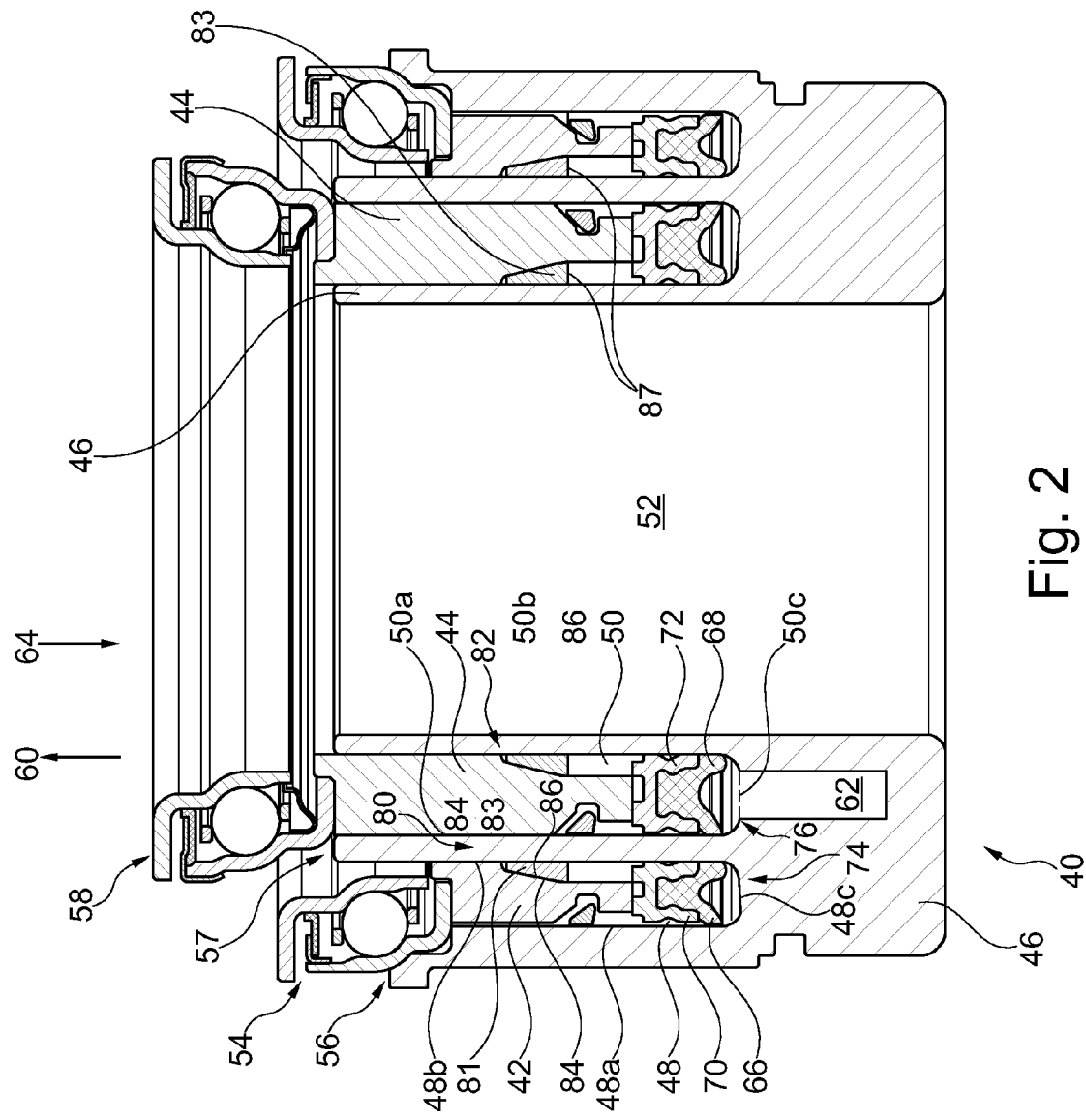
FIG. 2 shows a CSC in accordance with an embodiment of the present invention.

FIG. 2 shows a cross-sectional view of a CSC 40 in accordance with an embodiment of the present invention. CSC 40 may be used to operate a direct actuated double clutch and may be in hydraulic communication with an actuator unit. CSC 40 is a double clutch CSC including an outer piston 42 and an inner piston 44, which are independently axially movable within a housing 46. Specifically, housing 46 includes an outer annular bore 48, and an inner annular bore 50 concentrically disposed with respect to each other and a central bore 52 passing through a center of housing 46. Outer annular bore 48 is formed by first radially outer wall 48a and a first radially inner wall 48b, along both of which piston 42 is slidable, and a first axial wall 48c, which acts as an axial stop surface for piston 42. Inner annular bore 50 is formed by second radially outer wall 50a and a second radially inner wall 50b, along both of which piston 44 is slidable, and a second axial wall 50c, which acts as an axial stop surface for piston 44.

Outer piston 42 includes a release bearing 54 at an open end 56 of annular bore 48 thereof and inner piston 44 includes a release bearing 58 at an open end 57 of annular bore 50. Pistons 42, 44 are axially movable in a direction 60 by hydraulic fluid from the actuator unit that is provided to piston 44 via a pressure chamber 62 and is provided to piston 42 via a pressure chamber circumferentially offset from pressure chamber 62. Each piston 42, 44 causes the engagement of a respective one or more clutch discs upon actuation in direction 60. For disengagement of the respective one or more clutch discs, pistons 42, 44 are moved in a return direction 64.

Each piston 42, 44 includes a base portion 77 formed by an annular seal 66, 68, respectively, and a seal carrier 70, 72, respectively, fixing the respective seal 66, 68 thereto. Seals 66, 68 contact a closed end 74, 76, respectively, of annular bores 48, 50, respectively, when the clutch discs are disengaged and are forced away from closed ends 74, 76 by the hydraulic fluid for engaging the clutch discs. In order to compensate for wear of the clutch discs, axial one-way clutches 80, 82 are provided in annular bores 48, 50, respectively, for limiting the travel of pistons 42, 44, respectively.

Several components are required to make axial one-way clutches 80, 82 that allow travel freedom in one condition but travel limited freedom in the other. Part of each one way clutch is a respective cone-shaped ring 81, 83, which grips the walls of housing 46 of CSC 40. CSC 40 is designed so each ring 81, 83 can travel in a forward direction or engaging direction 60 with a minimum of force. If a respective angled contact surface 84 of piston 42, 44 contacts a respective angled surface 86 of the respective ring 81, 83 in the return direction or disengaging direction 64, the ring 81, 83 is wedged tightly against housing wall 48b, 50b and prevents further return of the respective piston 42, 44. In the forward direction 60 there is a flat contact 87 to each ring 81, 83, so there is no wedging of the ring and the axial resistance is only the frictional resistance caused by the hoop pressure of the ring against the corresponding housing wall.

Figure 3C:
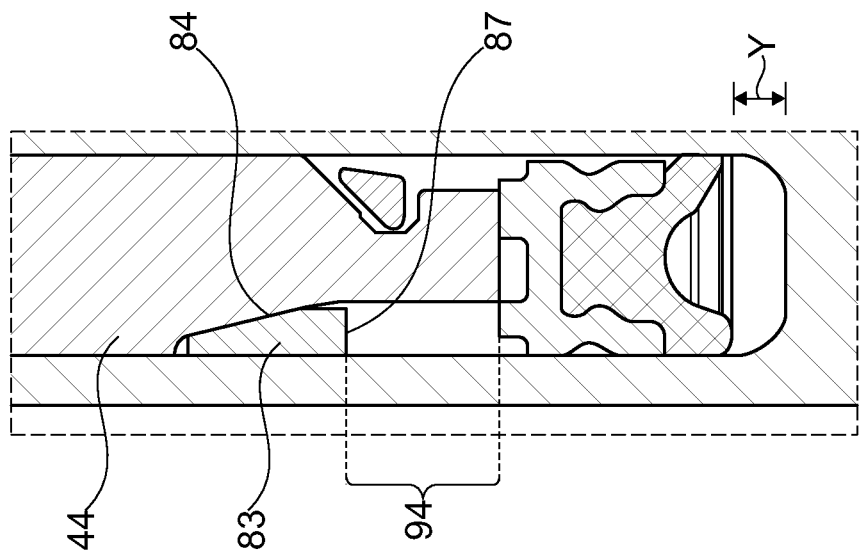
FIGS. 3a, 3b and 3c show enlarged views of the CSC shown in FIG. 2, illustrating the operation of the CSC.
Figure 3B:
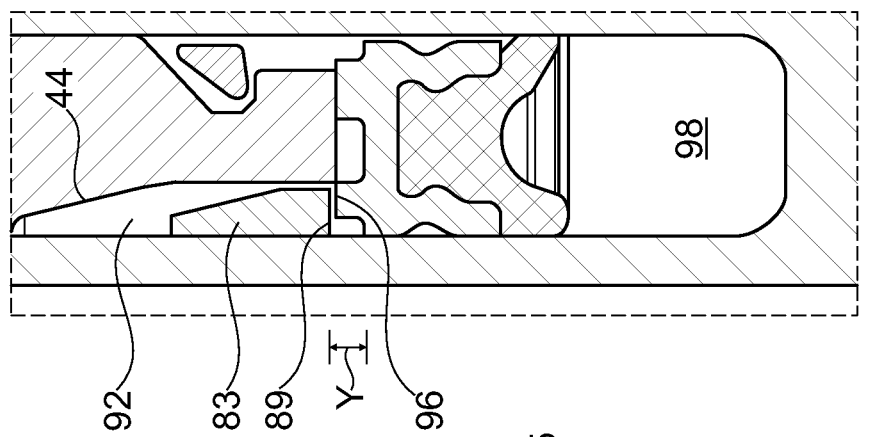
Figure 3A:
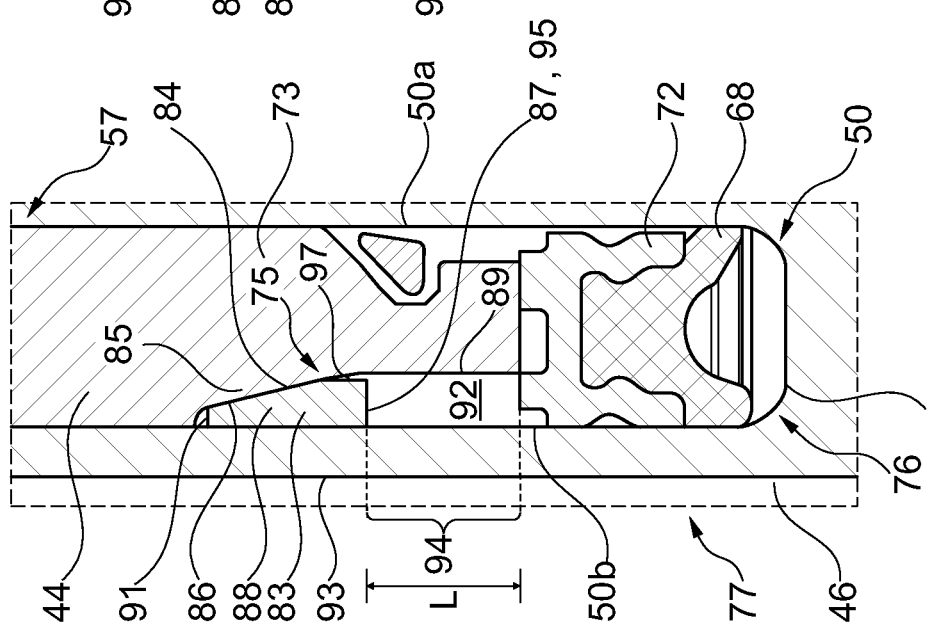

FIGS. 3a, 3b and 3c show enlarged cross-sectional views of piston 44 shown in FIG. 2, illustrating the operation of piston 44. Piston 42 is designed the same as and operates in the same manner as piston 44. Accordingly, the description of the design and operation of piston 44 also applies to the design and operation of piston 42. Piston 44 includes a first angled contact surface 84 for contacting a second angled contact surface 86 of ring 83. Contact surface 86 is formed on a frustoconical portion 88 of ring 83. Piston 44 is designed to include a body portion 73 with a cut-away portion 75, defined by angled contact surface 84, which is on a frustoconical portion 85 of piston 44, and a straight surface 89, which is cylindrically shaped and extends parallel to second radially inner wall 50b, protruding axially away from angled contact surface 84 toward closed end 76 of bore 50. Piston 44 and housing 46 form a chamber 92 therebetween in which ring 83 is positioned. Specifically, the cut-away portion 75 of piston 44 and the base portion 77 of piston 44, in the form of seal carrier 72, along with radially inner wall 50b of housing 46, defines chamber 92 of a fixed volume within bore 50 in which ring 83 is positioned.

Ring 83, in this embodiment, includes five surfaces—a first radially extending surface 91 facing open end 56; angled contact surface 86, which is connected to and angled away from surface 91 at an obtuse angle (as view in cross-section in FIG. 3a) on part of the outer radial surface of ring 83; an engagement surface in the form of inner radial surface 93, which is connected to surface 91, is cylindrically shaped and extends parallel to and slidably engages second radially inner wall 50b; a second radially extending surface 95 facing closed end 76, which includes flat contacts 87, extends radially inward from inner radial surface 93 and is wider than first radially extending surface 91; and a short cylindrical surface 97, which extends axially from second radially extending surface 91 and connects to angled contact surface 86 on the outer radial surface of ring 83. Second angled contact surface 86 and first radially extending surface 91 together form an acute angle.

Concentric slave cylinder 40 may be formed by sliding ring 83 into cut-away portion 75 of body portion 73 of piston 44, then fixing base portion 77, specifically seal 68 and seal carrier 72, to body portion 73. Piston 44 may then be slid along inner radial wall 50b such that first angled surface 84 of piston 44 contacts second angled surface 86 of ring 83. Ring 83 and piston 44 are then installed in bore hole 50 such that piston 44 and ring 83 are slidable toward the opening of hole 50 and ring 83 limits sliding of the piston 44 away from the opening of hole 50. Pressure chamber 62 is formed in housing 46 for providing hydraulic fluid to bore hole 50 such that pressure chamber 62 provides the hydraulic fluid along seal 67. Before inserting piston 44 in hole 50, release bearing 57 may be fixed to body portion 73 of piston 44.

When ring 83 engages piston 44, via contact between angled contact surfaces 84, 86, a travel free zone 94 of a predetermined length L is defined between ring 83 and carrier 72. Length L of travel free zone 94 defines the distance piston 44 can travel in the engagement direction 60 without ring 83 adjusting the return position of piston 44. When, due to wear decreasing the thickness of the clutch discs, piston 44 travels in the engagement direction 60 a distance greater than length L of travel free zone 94, the position of ring 83 is moved by piston 44. Specifically, when piston 44 travels in the engagement direction 60 a distance greater than length L of travel free zone 94, piston 44, via seal carrier 72, contacts flat contacts 87 on surface 95 of ring 83 and moves ring 83 toward open end 57 of bore 50 and away from closed end 76 of bore 50. Ring 83 is moved a distance equal to the distance piston 44 is moved further than length L. Ring 83 is then held at this new location due to friction between inner radial surface 93 of ring 83 and radially inner wall 50b of bore 50 in housing 46.

FIG. 3a shows piston 44 in a disengaged position, or a zero travel position, with the base portion 77 of the piston contacting the axial stop surface 50c in a zero travel position. Specifically, seal 68 is resting against axial stop surface 50c at closed end 76 of annular bore 50 and contact surface 84 of piston 44 is engaging contact surface 86 of ring 83.

FIG. 3b shows piston 44 at an engaging position in which piston 44 has been moved axially by hydraulic fluid a distance greater than length L of travel free zone 94. Specifically, in the arrangement in FIG. 3b, the hydraulic fluid has created a pressure chamber 98 between closed end 76 of bore 50 and seal 68, and piston 44 has moved axially a distance that is greater than length L by an overtravel distance Y. This overtravel has moved ring 83 away from stop surface 50c at closed end 76 of bore 50 by overtravel distance Y, as compared with the disengaged position shown in FIG. 3a. Specifically, an actuation surface 96 of piston 44, which in this embodiment is a surface of seal carrier 72, has contacted contacts 87 of ring 83 and moved ring 83 away from closed end 76 of bore 50 with piston 44. After the pressure of pressure chamber 98 decreases, piston 44 disengages from the clutch discs and moves away from open end 57 toward closed end 76. The friction between the inner radial surface 93 of ring 83 and the outer radial surface of radially inner wall 50b of housing 46 causes ring 83 to grip radially inner wall 50b and allows ring 83 to stay in place as piston 44 slides back toward closed end 76 of bore 50 and contact ring 83.

FIG. 3c shows CSC 40 after piston 44 is back in the disengaged position. Because ring 83 is held in place in the same position as in FIG. 3b, piston 44 is prevented from traveling back to the initial disengaged position shown in FIG. 3a. Piston 44 is held away from the position in FIG. 3a by overtravel distance Y. Ring 83 accordingly limits the distance piston 44 has to travel to reengage the corresponding clutch disc, which limits the travel of components, such as pistons, of the hydraulic system in which CSC 40 is used.

Surface 84 of piston 44 and surface 86 of ring 83 have matching angles which are such that they transfer a force in the return direction 64 to a force normal to the radially inner wall 50b. The angle of surfaces 84, 86 is designed so that the normal force on radially inner wall 50b times the friction coefficient of ring 83 to radially inner wall 50b is greater than the return force in direction 64. The material, surface conditions and treatment of ring 83 are such that the radially inner wall 50b to ring 83 friction coefficient is greater than the piston 44 to ring 83 friction coefficient such that ring 83 grips radially inner wall 50b.

Figure 4:
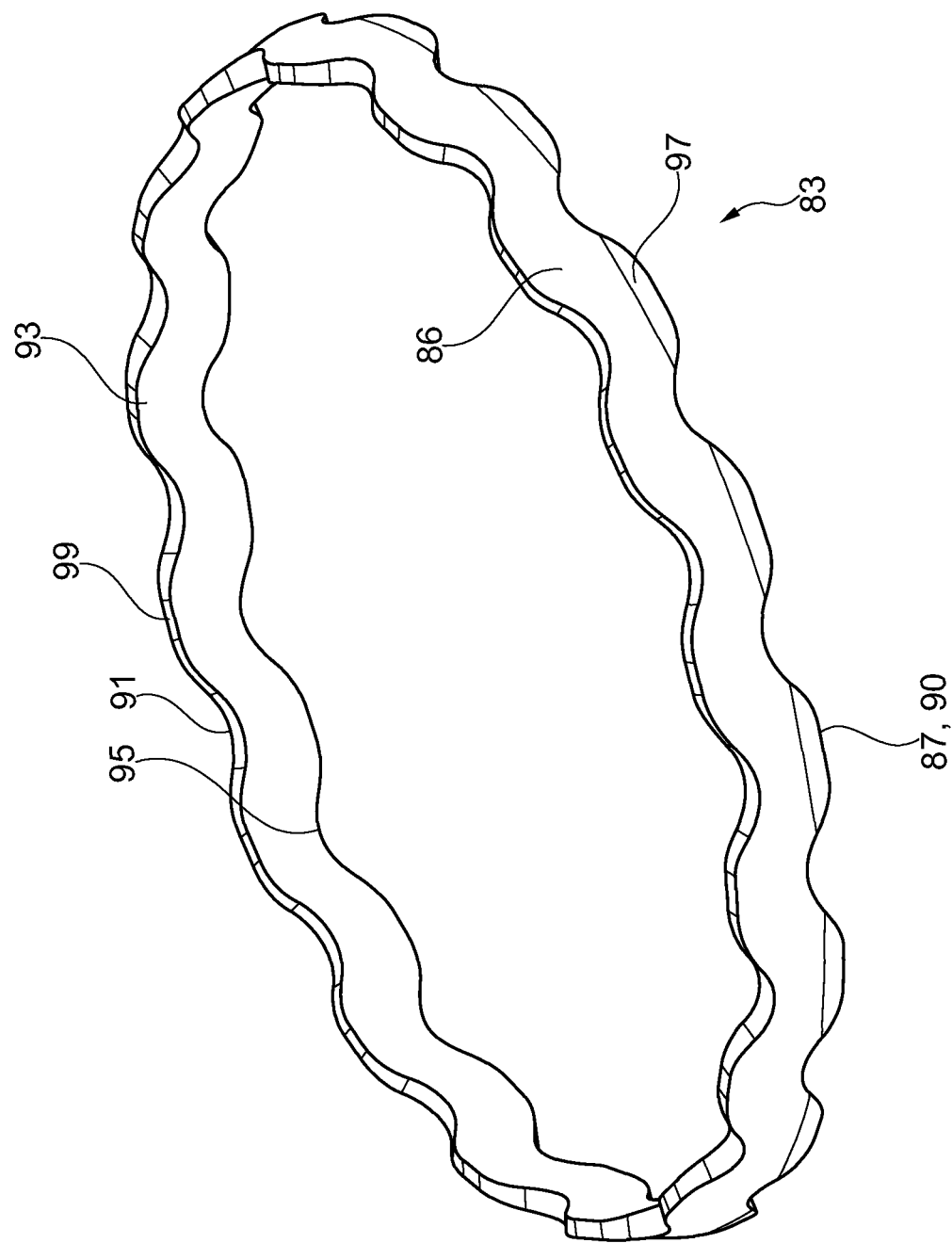
FIG. 4 shows a perspective view of a one-way clutch ring of the CSC shown in FIG. 2.

FIG. 4 shows ring 83 according to an embodiment of the present invention. Ring 83 has a wavy pattern to reduce the hoop stiffness thereof. A hoop stiffness that is too great may cause a force transfer though the ring to be too small for the ring to grip radially inner wall 50b. Also, if the hoop strength is too high, the mating tolerances between ring 83 and the radially inner wall 50b may create too much force variation in the forward direction 60. Accordingly, both first radially extending surface 91 and second radially extending surface 95 have a varying height, such that each surface 91, 95 defines a wavy pattern. More specifically, first radially extending surface 91 and second radially extending surface 95 follow essentially the same sinusoidal path, with peaks 90 of surface 95 forming the flat contacts 87 of ring 83 for contacting actuation surface 96 of piston 44.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A concentric slave cylinder for a motor vehicle clutch comprising:
    a housing including a wall;
    a piston slidable along the wall in a forward direction and a return direction, the piston including a first angled surface, the piston and the housing forming a hydraulic chamber therebetween; and
    a ring slidable along the wall in the hydraulic chamber in the forward direction and limiting sliding of the piston in the return direction, the ring including a frustoconical portion having a second angled surface for engaging the first angled surface to limit the sliding of the piston in the return direction, the ring including an engagement surface slidably engaging the wall, the second angled surface and the engagement surface together forming an acute angle such that the frustoconical portion gets radially thicker as the frustoconical portion extends in the return direction.

2. The concentric slave cylinder as recited in claim 1 wherein the frustoconical portion includes a radially extending surface connecting the second angled surface and the engagement surface, the radially extending surface having a varying height.

3. The concentric slave cylinder as recited in claim 2 wherein the radially extending surface defines a wavy pattern.

4. The concentric slave cylinder as recited in claim 2 wherein the radially extending surface includes contacts for contacting an actuation surface of the piston, contact between the contacts and the actuation surface forcing the ring in the forward direction.

5. The concentric slave cylinder as recited in claim 4 wherein the piston includes a seal and a seal carrier carrying the seal, the seal carrier including the actuation surface.

6. The concentric slave cylinder as recited in claim 1 wherein the first angled surface and the second angled surface engage each other at a first coefficient of friction and the engagement surface and the wall engage each other at a second coefficient of friction, the first coefficient of friction being less than the second coefficient of friction.

7. The concentric slave cylinder as recited in claim 1 wherein the piston includes a cut-away portion and a base portion; the cut-away portion, the base portion and the wall defining the chamber therebetween.

8. The concentric slave cylinder as recited in claim 7 wherein the housing includes an axial stop, the base portion of the piston contacting the axial stop in a zero travel position.

9. A clutch system comprising:
    the concentric slave cylinder as recited in claim 1;
    a direct actuated clutch operable by the concentric slave cylinder; and
    an actuator unit in hydraulic communication with the concentric slave cylinder.

10. The concentric slave cylinder as recited in claim 1 wherein the engagement surface extends parallel to the wall.

11. The concentric slave cylinder as recited in claim 10 wherein the engagement surface is cylindrically shaped.

12. The concentric slave cylinder as recited in claim 1 wherein the second angled surface has a continuous frustoconical shape.

13. The concentric slave cylinder as recited in claim 12 wherein the second angled surface follows a wavy pattern.

14. The concentric slave cylinder as recited in claim 3 wherein the varying height of the radially extending surface extends between peaks forming the contacts and valleys spaced away from the peaks in the forward direction.

15. The concentric slave cylinder as recited in claim 1 wherein when viewed cross-sectionally, the ring includes five different surfaces including the second angled surface, the engagement surface, a first radially extending surface extending radially from the engagement surface to the second angled surface, an axially extending surface extending away from the second angled surface in the return direction and a second radially extending surface extending radially from the engagement surface to the axially extending surface.

16. The concentric slave cylinder as recited in claim 15 wherein the second axially extending surface extends parallel to the engagement surface.

17. The concentric slave cylinder as recited in claim 15 wherein the first radially extending surface and the second radially extending surface follow a same sinusoidal path.

18. The concentric slave cylinder as recited in claim 15 wherein the second radially extending surface is wider than the first radially extending surface.

* * * * *